(12) United States Patent
Stammberger (10) Patent No.: US 11,415,156 B2
(45) Date of Patent: Aug. 16, 2022

(54) METHOD FOR MONITORING THE CONDITION OF A HYDRAULIC SYSTEM OF A METAL FORMING PLANT AND CONDITION-MONITORING DEVICE

(71) Applicant: SMS group GmbH, Düsseldorf (DE)

(72) Inventor: Reiner Stammberger, Kreuztal (DE)

(73) Assignee: SMS group GmbH, Düsseldorf (DE)

( * ) Notice: Subject to any disclaimer, the term of this patent is extended or adjusted under 35 U.S.C. 154(b) by 92 days.

(21) Appl. No.: 17/259,488

(22) PCT Filed: Jul. 12, 2019

(86) PCT No.: PCT/EP2019/068802
§ 371 (c)(1),
(2) Date: Jan. 11, 2021

(87) PCT Pub. No.: WO2020/011971
PCT Pub. Date: Jan. 16, 2020

(65) Prior Publication Data
US 2021/0293259 A1    Sep. 23, 2021

(30) Foreign Application Priority Data

Jul. 13, 2018   (DE) ..................... 10 2018 211 714.4

(51) Int. Cl.
*G05D 23/00*   (2006.01)
*F15B 19/00*   (2006.01)
(Continued)

(52) U.S. Cl.
CPC ........ *F15B 19/005* (2013.01); *F15B 21/0423* (2019.01); *F28F 27/00* (2013.01);
(Continued)

(58) Field of Classification Search
CPC .... F15B 11/028; F15B 11/0423; B30B 15/16; B30B 15/34
(Continued)

(56) References Cited

U.S. PATENT DOCUMENTS 2,358,353 A       9/1944  Stacy
2013/0204546 A1*  8/2013  Devine ................. F04B 51/00
                                                    702/182

(Continued)

FOREIGN PATENT DOCUMENTS

WO    2010136254 A1   12/2010
WO    2016202316 A1   12/2016

*Primary Examiner* — Long T Tran
*Assistant Examiner* — James J Kim
(74) *Attorney, Agent, or Firm* — Smartpat PLC (57) ABSTRACT

A method for monitoring the condition of a hydraulic system of a metal forming plant is presented. The hydraulic system is coupled to or provided with a pump drivable by a drive motor for providing a working fluid and with a heat exchanger. With the presented method, the following steps are initiated or carried out by a condition-monitoring device during the operation of the hydraulic system: Determining a current cooling power of the heat exchanger; determining a current conveying power of the pump; and determining a current maintenance urgency and/or a current ageing condition of the hydraulic system on the basis of the determined current cooling power of the heat exchanger. Furthermore, a condition-monitoring device designed to carry out the presented method is presented.

18 Claims, 3 Drawing Sheets

(51) Int. Cl.
  *F15B 21/0423* (2019.01)
  *F28F 27/00* (2006.01)
  *G06F 1/20* (2006.01)
  *G06Q 10/00* (2012.01)

(52) U.S. Cl.
  CPC ............. *G06F 1/206* (2013.01); *G06Q 10/20* (2013.01); *F15B 2211/611* (2013.01); *F15B 2211/62* (2013.01); *F15B 2211/632* (2013.01); *F15B 2211/633* (2013.01); *F15B 2211/6306* (2013.01); *F15B 2211/6343* (2013.01); *F15B 2211/863* (2013.01)

(58) Field of Classification Search
  USPC .......................................................... 700/300
  See application file for complete search history.

(56) References Cited

U.S. PATENT DOCUMENTS

| | | | |
|---|---|---|---|
| 2018/0149371 A1* | 5/2018 | Dostal | F24D 19/1012 |
| 2020/0217335 A1* | 7/2020 | Carlson | F15B 11/028 |

* cited by examiner

METHOD FOR MONITORING THE CONDITION OF A HYDRAULIC SYSTEM OF A METAL FORMING PLANT AND CONDITION-MONITORING DEVICE

TECHNICAL FIELD

The present disclosure relates to a method for monitoring the condition of a hydraulic system of a metal forming plant. In addition, the disclosure relates to a condition-monitoring device.

BACKGROUND

Today's metal forming plants, such as rolling mill plants, press plants or continuous casting plants, have a hydraulic system that provides working fluid and working components for metal forming that can be operated with the working fluid. To maintain stable operating temperatures, one or more heat exchangers are provided in the hydraulic system to transfer a portion of the thermal energy of the working fluid flowing through their primary side to a cooling fluid provided on the secondary side of the heat exchangers.

Such a metal forming plant and in particular its hydraulic system must be maintained regularly as a preventive measure, that is, well in advance of the expected failure of a component of the hydraulic system, in order to prevent unexpected failures of the metal forming plant, which is associated with high costs. However, in order to reduce the maintenance costs of a metal forming plant, it is desirable to carry out or schedule maintenance measures only when a predetermined real wear condition of the metal forming plant or the hydraulic system, as the case may be, is reached or exceeded.

The concept of condition monitoring is generally known for the optimized scheduling of maintenance measures on technical systems. The term "condition monitoring" describes a condition monitoring of a technical system with the steps of a detecting of the condition of the plant and a comparison of the detected condition with reference values.

In the field of hydraulic systems of metal processing plants, however, there is a lack of practical and economically feasible concepts for condition monitoring.

SUMMARY

The present disclosure is therefore based on the object of providing a method for the condition monitoring of a hydraulic system and a corresponding condition-monitoring device, which enable technically simple and economically feasible scheduling of maintenance work on metal forming plants with hydraulic systems.

The object is achieved by a method and by a condition-monitoring device presented below. As a starting point, the inventor found that the maintenance urgency of the hydraulic system of a metal forming plant and/or the ageing condition of the hydraulic system can be specified or derived, as the case may be, by determining and linking to each other the current cooling power of the heat exchanger of the hydraulic system and the current conveying power of the pump of the hydraulic system.

The method is directed to a hydraulic system of a metal forming plant, wherein the hydraulic system is coupled or provided with at least one pump that can be driven by at least one drive motor and with at least one heat exchanger. The terms "pump" and "heat exchanger" used in the claims in the singular similarly include the respective multiple number of such components. If the respective multiple number of such components is provided in the hydraulic system, the method is applied to the totality of such components. Accordingly, the method preferably provides that the current total cooling power of all heat exchangers and the current total conveying power of all pumps delivering the working fluid are considered for determining the current maintenance urgency and/or the current ageing condition of the hydraulic system.

The method is directed to a hydraulic system provided with or coupled to a heat exchanger (in the sense of one or more heat exchangers) having a primary side and a secondary side, wherein an inlet port and an outlet port are provided at least on the primary side of the heat exchanger. A working fluid, in particular oil, used in the hydraulic system is supplied to the primary-side inlet port of the heat exchanger, flows through a primary circuit section of the heat exchanger, and is discharged at the primary-side outlet port of the heat exchanger. The working fluid is supplied to working components arranged upstream and/or downstream of the heat exchanger, for example roll stands or press tools, of the metal forming plant. The working fluid is moved by the pump of the hydraulic system in an open or closed circuit. A cooling fluid, for example water and/or air, is provided on the secondary side of the heat exchanger, in order to absorb part of the thermal energy of the working fluid flowing through the primary circuit section of the heat exchanger. The cooling fluid can be supplied, for example, as cooling water at a secondary-side inlet port of the heat exchanger and discharged at a secondary-side outlet port of the heat exchanger after flowing through the secondary circuit section of the heat exchanger. The cooling fluid can alternatively or optionally flow around the primary circuit section of the heat exchanger as air. The heat exchanger is designed to transfer a power from the working fluid flowing through it to the cooling fluid. A heat energy currently transferred from the primary side to the secondary side of the heat exchanger per unit of time is referred to as the cooling power or heat dissipation power of the heat exchanger. A manner for determining the current cooling power of the heat exchanger of the hydraulic system with little effort is described below.

In addition, the method is directed to a hydraulic system in which the working fluid is conveyed or pumped, as the case may be, by a drivable pump (in the sense of one or more pumps) of the hydraulic system at a current conveying power and is thus provided to the working components of the hydraulic system at a predetermined volume flow and/or within a predetermined pressure range. The current conveying power of the pump can be determined by measuring the current conveying power directly or indirectly. The pump is driven by a drive motor (in the sense of one or more drive motors) of the hydraulic system. The drive motor can be an electric motor, in particular a three-phase asynchronous machine. For the presented method, the current conveying power of the pump can be determined, for example, by determining or measuring, as the case may be, the current electrical power consumption of the electric drive motor of the pump using a known method.

In accordance with the presented method, the current cooling power of the heat exchanger of the hydraulic system and the current conveying power of the pump of the hydraulic system are determined, by a condition-monitoring device or at the request of the condition-monitoring device, and are used for the determination or assessment, as the case may be, of a current maintenance urgency and/or a current ageing condition of the hydraulic system to be carried out by the method. Such assessment can be undertaken by having the condition-monitoring device compare or cause to be compared the determined cooling power and the determined conveying power with individually predetermined reference values for the determined power types. Such assessment can also be undertaken by the condition-monitoring device combining the determined cooling power and the determined delivery power with weights individually predetermined for the determined power types into an overall information, and comparing such overall information with one or more predetermined overall reference values, or causing such comparison. The predetermined reference values can be measured values of the hydraulic system subjected to the condition-monitoring procedure immediately after initial commissioning or immediately after maintenance of the hydraulic system. For example, the current maintenance urgency and/or the current maintenance condition of the hydraulic system can be determined as binary information in terms of "maintenance required" or "maintenance not required," as the case may be, but is preferably determined as numerical information having more than two conditions (for example, 0 to 100% maintenance urgency, with a 1% increment).

The presented method makes it possible that maintenance measures on the hydraulic system of a metal forming plant are not carried out in accordance with a carefully designed fixed schedule, but only when the maintenance measures are actually required or will be required in the near future. The presented method enables a technically simple and economically feasible scheduling of maintenance work on metal forming plants with hydraulic systems.

In an additional form of the presented method, it is provided that the condition-monitoring device further determines a current ambient temperature of heat radiating surfaces of the hydraulic system and calculates the current maintenance urgency and/or the current ageing condition of the hydraulic system, also taking into account the determined ambient temperature. The current cooling power of the heat exchanger of the hydraulic system depends on the current ambient temperature of the heat radiating surfaces of the hydraulic system. By determining the current ambient temperature of the heat radiating surfaces of the hydraulic system, the condition-monitoring device can more accurately evaluate the determined current cooling power of the heat exchanger and more accurately derive the current ageing condition or current maintenance urgency, as the case may be, of the hydraulic system from such more accurate evaluation.

In a further embodiment of the aforementioned additional form of the presented method, it is provided that the condition-monitoring device determines as the current ambient temperature of the heat radiating surfaces of the hydraulic system an outdoor temperature at the location of the hydraulic system and/or the metal forming plant. The outdoor temperature is preferably determined by retrieving weather data from a weather service server related to the location of the hydraulic system or metal forming plant, as the case may be. The current ambient temperature of the heat radiating surfaces of the hydraulic system is highly dependent on the current outside temperature prevailing at the location of the hydraulic system or the metal forming plant, as the case may be. Thus, information about the current ambient temperature of the heat radiating surfaces of the hydraulic system can be obtained from the current outdoor temperature with little implementation effort. In addition to or instead of the outside temperature, the condition-monitoring device can also take into account other information about climatic conditions prevailing at the location of the metal forming plant for determining the maintenance urgency or the ageing condition, as the case may be, of the hydraulic system when carrying out the presented method.

In an additional form of the presented method, it is provided that the condition-monitoring device determines information about an efficiency of the hydraulic system on the basis of the determined cooling power of the heat exchanger and the determined conveying power of the pump. Preferably, the ambient temperature of the heat radiating surfaces of the hydraulic system is also determined for determining the efficiency of the hydraulic system, for example in the form of or based on the outdoor temperature currently prevailing at the location of the metal forming plant. The efficiency can be determined by setting the determined conveying power of the pump, measured as the electrical power consumed by the drive motor of the pump, in relation to the determined cooling power of the heat exchanger, and additionally taking into account the climatic conditions at the location of the hydraulic system or the metal forming plant, as the case may be.

In an additional form of the presented method, it is provided that the condition-monitoring device determines the current maintenance urgency and/or the current ageing condition of the hydraulic system based on a determined chronological course of the cooling power of the heat exchanger and/or a determined chronological course of the conveying power of the pump. Thus, for determining the current maintenance urgency and/or the current ageing condition of the hydraulic system, the condition-monitoring device in accordance with the presented method considers the history of the determined cooling power of the heat exchanger and the history of the determined conveying power of the pump. In this manner, the maintenance urgency or the ageing condition, as the case may be, of the hydraulic system can be determined or derived with particular accuracy.

In an additional form of the presented method, it is provided that the condition-monitoring device determines and stores, in a retrievable manner, information for the optimized dimensioning of a heat exchanger of a hydraulic system of the same type on the basis of the determined chronological courses of the cooling power of the heat exchanger and the conveying power of the pump. Such information, obtained and made available on demand, enables the optimized design of new, identical metal forming plants and avoids the use of an oversized heat exchanger for their hydraulic system. For the determination of such information, the ambient temperature of the heat radiating surfaces of the hydraulic system is preferably also taken into account, for example as a history of the outside temperature at the location of the metal forming plant.

The presented method is preferably applied to a so-called open hydraulic system, with which the hydraulic circuit is open and not closed. With such open hydraulic system, the pump driven by a drive motor draws the working fluid from a working fluid supply source, such as a tank that is not pressure-tight or open, as the case may be, to the ambient atmosphere, and pumps the drawn working fluid to the heat exchanger and at least one hydraulic motor of the metal forming plant. The pumped working fluid is then supplied back into the working fluid supply source. In contrast to the closed hydraulic system, the open hydraulic system is not a hydraulic system that is completely enclosed from the ambient atmosphere.

The presented method is preferably applied to a metal forming plant, which is designed as a rolling mill plant, a press plant or a continuous casting plant.

With the presented method, the condition-monitoring device uses a determined current cooling power of the heat exchanger of a hydraulic system used in a circulating loop to determine the current maintenance urgency and/or the current ageing condition of the hydraulic system. Methods for determining the current cooling power of a heat exchanger are known in principle. In the sense of the presented method, the determination of the current cooling power of the heat exchanger is equivalent to a detection of the current condition of the heat exchanger, that is, a condition detection of the heat exchanger. The current cooling power of the heat exchanger is understood as the amount of heat energy per unit of time that is currently transferred through the heat exchanger from the working fluid to the cooling fluid.

In an additional form of the presented method, it is provided that the current cooling power of the heat exchanger is determined in a particularly low-effort manner. Thereby, the method makes use of the finding that a very simple condition detection of the heat exchanger or determination, as the case may be, of the current cooling power of the heat exchanger is possible through specific simplified assumptions of the physical processes in the heat exchanger.

In the presented method, the current cooling power of the heat exchanger can be determined during the ongoing operation of the hydraulic system on the basis of measured values and default values assigned only to the working fluid. Such condition detection of the heat exchanger is based on the simplified assumption that the power dissipated from the primary side of the heat exchanger is fully transferred to the secondary side of the heat exchanger, such that the power assessment is sufficient for either the primary side or the secondary side.

The current cooling power Pw of the heat exchanger can thus be determined as the product of the specific gravity of the fluid $\rho$, the volume flow of the fluid Q, the specific heat capacity of the fluid $c_P$ and the temperature difference $\Delta T$ between the inlet port and the outlet port through which the fluid is supplied or discharged, as the case may be:

$$Pw = \rho \cdot Q \cdot c_P \cdot \Delta T \quad (1)$$

Furthermore, for hydraulic systems, the simplification that the heat exchangers are employed in the circulating loop is used. The sole consideration of the working fluid side of the heat exchanger, that is, the primary side, is particularly useful for the presented condition detection, because a constant volume flow prevails or can be adjusted there, no fouling occurs in comparison to the secondary side, and—without limiting the invention to this—a constant pressure range of approximately 4 bar with a tolerance of ±2 bar prevails. The above simplifications apply to heat exchangers with water and/or air coolers on the secondary side.

For the determination of the current cooling power of the heat exchanger in accordance with the presented method, in principle, it is necessary that the specific heat capacity and the specific gravity of the working fluid are set or predetermined, as the case may be. Assuming that such parameters of the working fluid do not change or change only insignificantly during the ongoing operation of the hydraulic system, such parameters can be set or predetermined, as the case may be, once in a manner specified to the working fluid.

The volume flow Q of the working fluid flowing through the heat exchanger on the primary side can be measured or set in the presented method. If a known constant volume flow is provided, for example by a gear pump or a screw spindle pump, then the constant volume flow can be specified as a default value. In the case of an unknown or fluctuating volume flow, the volume flow of the working fluid passing through the heat exchanger on the primary side is measured. Due to relatively constant ratios of volume flow and viscosity of the working fluid, a pressure difference recording of the working fluid is sufficient for volume flow indication or volume flow measurement, as the case may be. A specific volume flow can be assigned to a measured difference between a measured pressure of the working fluid in the primary circuit of the heat exchanger and a reference pressure.

For determining the current cooling power of the heat exchanger in accordance with the additional form of the presented method, at least one measured value is further required per determination, which represents the temperature difference $\Delta T$ of the working fluid caused by the heat transfer from the primary side to the secondary side, for example between the inlet port and the outlet port of the primary side of the heat exchanger. To carry out such measurement, a temperature sensor can be provided at the inlet port (to measure the inlet temperature) and the outlet port (to measure the outlet temperature) of the primary side of the heat exchanger, respectively. A cost-effective temperature measurement can be carried out by means of PT100 sensors.

Even in the most complex technical implementation of the additional form of the presented method, only two temperature sensors and one volume flow sensor or pressure sensor are used to determine the current cooling power of the heat exchanger. This enables a technically simple, cost-effective and robust monitoring of the heat exchanger during the operation of the metal forming plant.

An additional form of the presented method further provides that the determined current cooling power of the heat exchanger is visualized or displayed, as the case may be, on a display device. The permanent visualization of the determined current cooling power of the heat exchanger for an operator of the plant or a designer of a new similar plant to be designed ensures a safe and efficient operation of the plant and also enables an optimized design of future similar plants.

In an additional form of the presented method, it is provided that the determined cooling power is rejected as implausible by the condition-monitoring device if the measured values of the working fluid lie outside a defined predetermined working range. This is accompanied by the fact that the implausible power value is not used to determine the current maintenance urgency of the hydraulic system; rather, an error message is generated. This increases the operational reliability of the metal forming plant.

The determination of the current cooling power of the heat exchanger or the condition detection of the heat exchanger, as the case may be, as has been illustrated above and will be illustrated in detail with respect to the exemplary embodiments, can also be carried out separately from the determination of the current conveying power of the pump and the determination of the current maintenance urgency and/or the current ageing condition of the hydraulic system, and then represents an independent method for the condition detection of the heat exchanger of the hydraulic system of the metal forming plant. The detected condition of the heat exchanger can also be visualized on a display device to an operator of the metal forming plant.

The current cooling power of the heat exchanger can be determined with a heat exchanger condition detection device designed to receive measured values representing current temperatures of the working fluid flowing through the heat exchanger. For example, the heat exchanger condition detection device includes or can be coupled to two temperature sensors arranged on/in the primary circuit of the heat exchanger, in such a manner that the temperature difference by which the working fluid is cooled as it flows through the heat exchanger can be determined or measured. In addition, the heat exchanger condition detection device is designed to receive a measured value or a default value, which indicates the primary-side volume flow of the heat exchanger at least once. In addition, the heat exchanger condition detection device is designed to store or program in, as the case may be, default values, such as, for example, the specific heat capacity and the specific gravity of the working fluid.

The heat exchanger condition detection device can be further designed to visualize or display (or cause to be visualized or displayed), as the case may be, the determined cooling power of the heat exchanger on a display device. In this design, the heat exchanger condition detection device is a power monitor for the hydraulic system of the metal forming plant. Such a power monitor is designed to permanently determine the current cooling power of the heat exchanger of the open hydraulic system of the metal forming plant during the operation of the hydraulic system and to permanently display the determined cooling power of the heat exchanger on a display device housed in or provided to the power monitor.

The object of the disclosure is also achieved by a condition-monitoring device, which is designed to carry out the presented method above or one of its additional forms. The condition-monitoring device comprises or is coupled to the heat exchanger condition detection device described above. In addition, the condition-monitoring device is designed to determine the current conveying power of the pump of the hydraulic system. For this purpose, it is sufficient that the condition-monitoring device is designed to measure or determine the electrical power consumed by the pump. The condition-monitoring device can be embodied in a programmable computer, which executes the presented method while processing a program.

In an additional form of the presented condition-monitoring device, the condition-monitoring device further comprises or is coupled to a power monitor, wherein the power monitor is designed to continuously display on a display device the current cooling power of the heat exchanger determined by the condition-monitoring device.

Features of the presented method can be implemented in the condition-monitoring device, and vice versa. Any of the presented features can be freely combined.

BRIEF DESCRIPTION OF THE DRAWINGS

To illustrate the proposed method and the proposed condition-monitoring device, exemplary embodiments are now presented with reference to the following figures.

In the figures listed, identical or similar components are designated with the same reference signs across figures.

DETAILED DESCRIPTION

Figure 1:
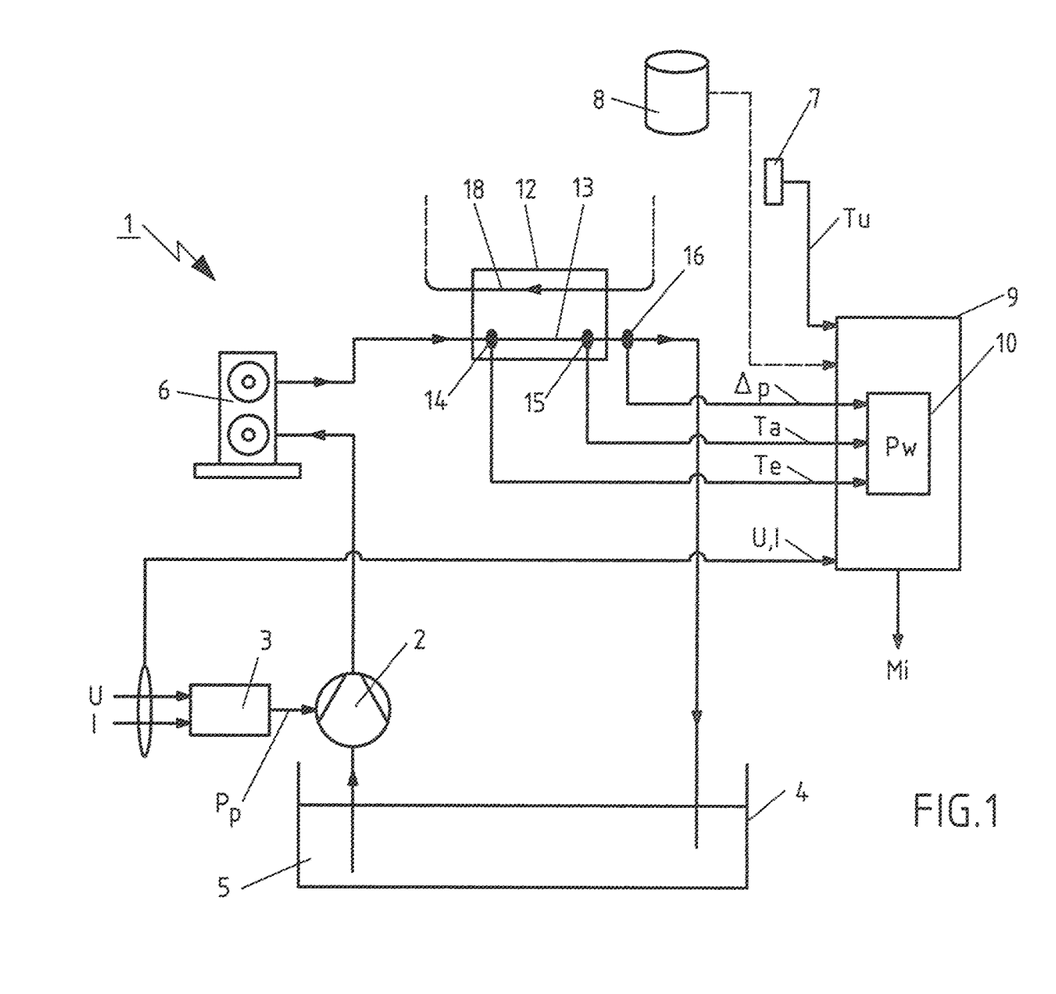
FIG. 1 schematically illustrates a metal forming plant with a hydraulic system, the condition of which is monitored with an exemplary embodiment of the presented condition-monitoring device.

FIG. 1 schematically illustrates a metal forming plant with a hydraulic system, the condition of which is monitored by an exemplary embodiment of the presented condition-monitoring device. By way of example, without limiting the present invention to such a metal forming plant, the metal forming plant 1 is designed as a rolling mill having a plurality of rolling stands 6 operated by a working fluid of a hydraulic system.

The metal forming plant 1 has a hydraulic system with an open hydraulic circuit, with which a working fluid 5 is pumped from a working fluid supply source 4, for example a tank, through a pump 2 driven by an electric motor 3 to the rolling stands 6, a heat exchanger 12 and then back to the working fluid supply source 4. Hydraulic lines, through which the working fluid is pumped, are provided between components 2, 6, 12 and 4 of the hydraulic system. For example, the hydraulic system is designed to provide the working fluid to the roll stands 6 at a constant volume flow and at a predetermined pressure range of 4 bar with a tolerance of ±2 bar. The working fluid is pumped through a primary circuit section 13 of the heat exchanger 12, such that some of the thermal energy of the working fluid is transferred to a cooling fluid, such as cooling water, which flows through a secondary circuit section 18 of the heat exchanger 12.

The metal forming plant schematically illustrated in FIG. 1 with the hydraulic system 1 is coupled to an exemplary embodiment of a condition-monitoring device 9. The condition-monitoring device 9 is designed to determine the current maintenance urgency and/or the current maintenance condition of the hydraulic system of the metal forming plant 1 in accordance with the presented method. The condition-monitoring device 9 illustrated in FIG. 1 determines the current maintenance urgency and/or the current maintenance condition of the hydraulic system as a value Mi, which represents, for example, the determined current maintenance urgency as an integer value between 0 (maintenance not required; new condition) and 100 (maintenance absolutely required).

As illustrated in FIG. 1 and explained in more detail with reference to FIG. 3, the heat exchanger 12 is provided with temperature sensors 14 and 15 arranged on its primary side on the inlet and outlet, as the case may be, the temperature measured values Te and Ta of which are supplied to the condition-monitoring device 9 and a heat exchanger condition detection device 10 accommodated therein, as the case may be.

Further, the condition-monitoring device 9 is designed to calculate the electrical power consumed by the electric drive motor 3 of the pump 2 on the basis of the measured electrical currents I and voltages U supplied to the electrically driven drive motor 3 during the operation of the metal forming plant. The condition-monitoring device 9 is designed to calculate the current conveying power (illustrated in FIG. 1 as Pp, neglecting friction losses) of the pump 2 from the calculated absorbed electrical power of the drive motor 3. The electric drive motor 3 can be designed as a three-phase asynchronous machine. In such a case, the measured voltages and currents of the drive motor 3 are supplied to the condition-monitoring device 9 in a phase-specific manner, such that the condition-monitoring device 9 can calculate the current conveying power of the pump 2 from such measured values.

In addition, the condition-monitoring device 9 illustrated in FIG. 1 is coupled to an outdoor temperature sensor 7, which measures an outdoor temperature Tu currently prevailing at the location of the metal forming plant 1 and transmits the measured values to the condition-monitoring device 9. The condition-monitoring device 9 uses such measured values Tu as information about the current ambient temperature of the heat radiating surfaces of the hydraulic system and determines the current maintenance urgency and/or the current ageing condition of the hydraulic system, in addition to the determined current cooling power Pw of the heat exchanger 12 and the determined current conveying power Pp of the pump 2, on the basis of the measured values Tu. Optionally or alternatively, the condition-monitoring device 9 at the location of the metal forming plant 1 can also retrieve past or currently prevailing outdoor temperatures as data from an external server 8 of a weather service.

Figure 2:
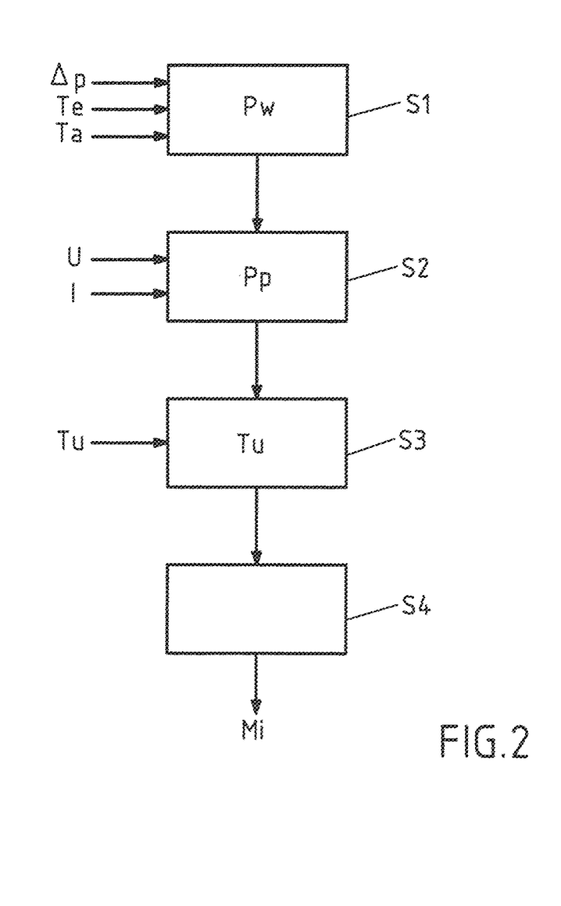
FIG. 2 shows a flow chart of an exemplary embodiment of the presented method, which is carried out by the condition-monitoring device illustrated in FIG. 1.

FIG. 2 shows a flow chart of an exemplary embodiment of the presented method, which is carried out by the condition-monitoring device 9 illustrated in FIG. 1. In step S1, the current cooling power Pw of the heat exchanger 12 is calculated on the basis of measured values Δp of the pressure sensor 16, Te of the temperature sensor 14 and Ta of the temperature sensor 15, which is explained in more detail with reference to FIG. 3 and FIG. 4 below. In step S2, the current conveying power Pp of the pump 2 is calculated on the basis of the measured voltage and current measured values U, I of the drive motor 3. In step S3, the outdoor temperature Tu currently prevailing at the location of the metal forming plant 1 is read. Steps S1 to S3 can be processed in any chronological sequence or simultaneously. In step S4 following steps S1 to S3, the condition-monitoring device 9 determines, on the basis of the values Pw, Pp, and Tu determined in steps S1 to S3, a value Mi, which represents the current maintenance urgency or ageing condition, as the case may be, of the hydraulic system of the metal forming plant 1. Steps S1 to S4 are continuously repeated during the operation of the metal forming plant 1, such that the value Mi is continuously updated.

Figure 3:
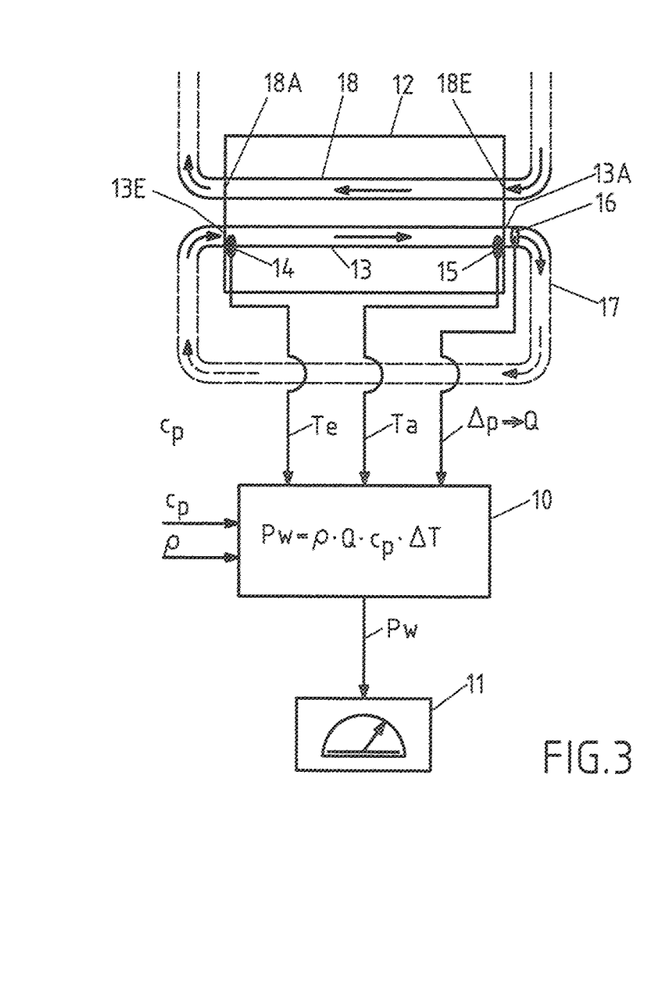
FIG. 3 schematically illustrates the heat exchanger shown in FIG. 1 in a highly simplified form and a power monitor with which the current cooling power of the heat exchanger is determined and displayed to an operator in accordance with an exemplary embodiment of the presented method.

In FIG. 3, the heat exchanger 12 shown in FIG. 1 in a highly simplified manner is schematically illustrated in more detail. In addition, FIG. 3 illustrates in more detail the heat exchanger condition detection device 10 shown in FIG. 1 as part of the condition-monitoring device 9, which is further coupled to a display device 11. The heat exchanger condition detection device 10 and the display device 11 form a power monitor, by which the current cooling power Pw of the heat exchanger 12 is determined and displayed to an operator of the metal forming plant, in accordance with an exemplary embodiment of the presented method. The power monitor is designed to continuously determine and display the cooling power Pw of the heat exchanger 12 during the operation of the hydraulic system.

The heat exchanger 12 illustrated by way of example in FIG. 3 is designed in accordance with the counterflow principle, and has a primary circuit section 13 for passing the working fluid of the hydraulic system from a primary-side inlet port 13E to a primary-side outlet port 13A, and a secondary circuit section 18 for passing a cooling fluid from a secondary-side inlet port 18E to a secondary-side outlet port 18A. A temperature sensor 14 for detecting the temperature Te of the working fluid introduced into the primary circuit section 13 is provided at the inlet port 13E. A temperature sensor 15 for detecting the temperature Ta of the working fluid discharged from the primary circuit section 13 is provided at the outlet port 13A. Further, a pressure sensor 16 for detecting a pressure difference Δp with respect to a reference pressure is provided at the outlet port 13A. The pressure sensor 16 can alternatively be designed as a volume flow sensor for directly measuring the volume flow in the primary circuit section 13. The hydraulic system is designed in such a manner that the working fluid is supplied to the heat exchanger 12 in a circulating loop 17 (shown in FIG. 3 only in a highly simplified form). The working fluid is further supplied to working components of the metal forming plant (not shown in FIG. 3) during the ongoing operation of the metal forming plant.

The heat exchanger condition detection device 10 is coupled to the heat exchanger 12 via signal lines and receives measured values from the temperature sensors 14, 15 and the pressure sensor 16 via the signal lines. The heat exchanger condition detection device 10 is designed to assign the received measured value of the pressure sensor 16 to a corresponding volume flow Q. Further, the heat exchanger condition detection device 10 is designed to calculate the temperature difference ΔT between the received measured values Te and Ta. In addition, the heat exchanger condition detection device 10 is designed to receive and store default values for the specific gravity p and the specific heat capacity $c_p$ of the working fluid. The heat exchanger condition detection device 10 can also store the respective specific gravity and specific heat capacity for a plurality of working fluids. The heat exchanger condition detection device 10 is designed to determine the current cooling power Pw of the heat exchanger on the basis of the received measured values Te, Ta (or ΔT, as the case may be), the received measured value Δp (or Q, as the case may be) and the stored default values ρ and $c_p$ of the working fluid in accordance with the above equation (1). The heat exchanger condition detection device 10 is coupled to a display device 11, which displays the cooling power Pw determined by the heat exchanger condition detection device 10 to an operator. The heat exchanger condition detection device 10 is further designed to continuously receive at least currently measured temperature values, and to determine the cooling power Pw on the basis of such measured temperature values.

Figure 4:
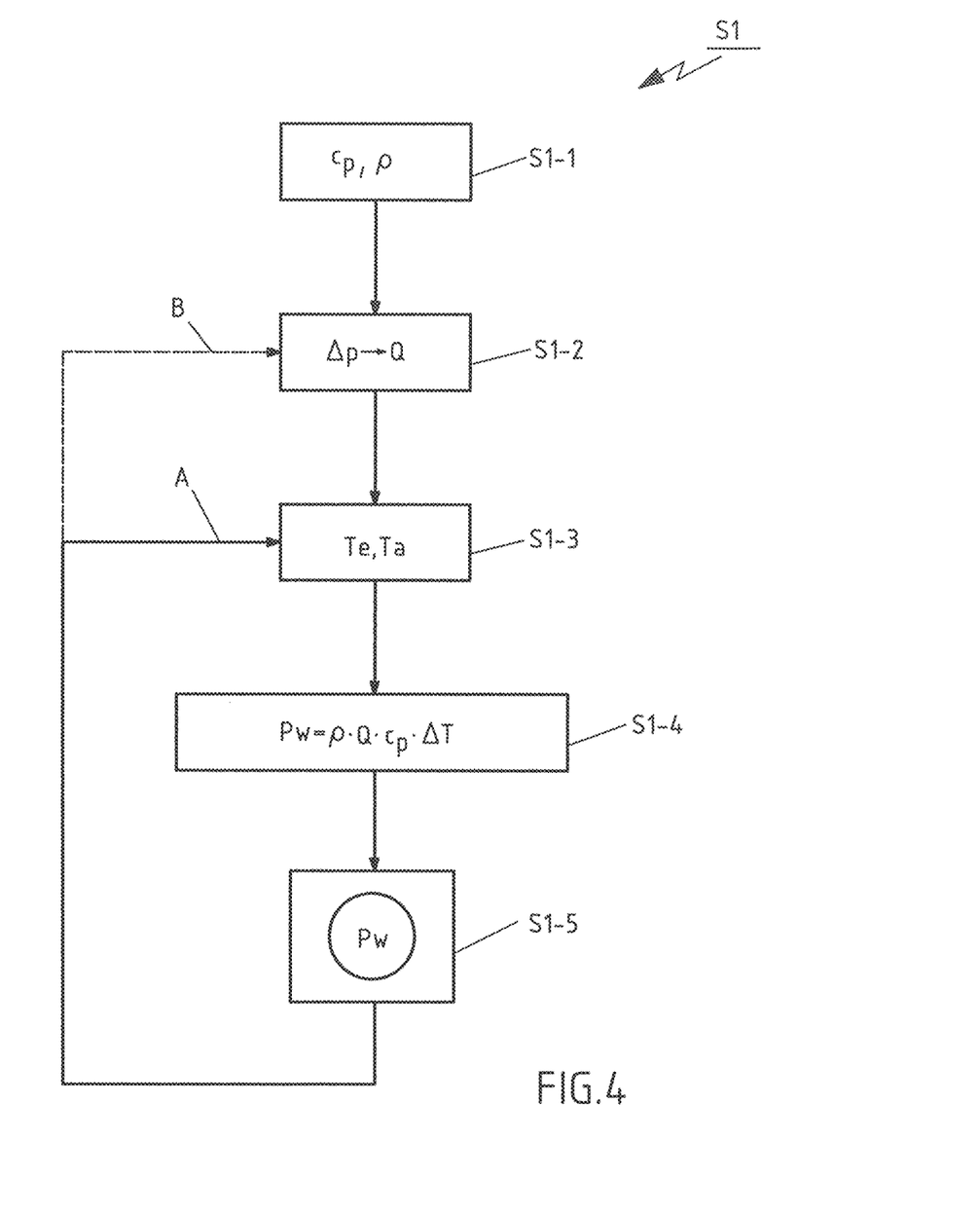
FIG. 4 shows a flow chart of a method carried out by the power monitor illustrated in FIG. 3 for determining the current cooling power of the heat exchanger in accordance with an exemplary embodiment of the presented method.

FIG. 4 shows a flow chart of a method carried out by the power monitor illustrated in FIG. 3 for determining the current cooling power of the heat exchanger in accordance with an exemplary embodiment of the presented method. Specifically, FIG. 4 shows two alternative exemplary embodiments of the method step S1 illustrated in FIG. 2 for determining the current cooling power Pw of the heat exchanger 12, wherein the step S1-5 for displaying the determined cooling power Pw is optional.

In step S1-1, the values ρ and $c_p$ of the working fluid are predetermined as default values for the heat exchanger condition detection device 10. Following step S1-1, in step S1-2, the pressure difference Δp is measured by the pressure sensor 16 and transmitted to the heat exchanger condition detection device 10, which assigns the measured value to a volume flow Q.

Following step S1-2, in step S1-3, the temperatures Te and Ta at the inlet and outlet of the primary circuit section 13 of the heat exchanger 12 are measured and supplied to the heat exchanger condition detection device 10 as corresponding signals.

Step S1-3 is followed by step S1-4. In step S1-4, the temperature difference ΔT is calculated as the difference between Te and Ta. Only if the measured values Te, Ta and Δp or Q are within a predefined working range of the heat exchanger 12, the cooling power Pw of the heat exchanger 12 is then determined in step S1-4 on the basis of the equation (1) shown above and transmitted to a display device 11. Otherwise, the display device 11 is caused to output an error message in step S1-5.

Following step S1-4 with measured values Te, Ta and Δp or Q within the predefined working range of the heat exchanger 12, in step S1-5, the display device 11 presents the cooling power value Pw determined by the heat exchanger condition detection device 10.

Following step S1-5, steps S1-3, S1-4 and S1-5 are carried out again in accordance with a first alternative A, which provides for only one direct or indirect measurement of the volume flow until the next interruption of the operation of the hydraulic system. In accordance with an alternative B with repeated measurement of the volume flow, steps S1-2, S1-3, S1-4 and S1-5 are carried out again following step S1-5. The repetition of steps S1-3 to S1-5 in accordance with variant A or steps S1-2 to S1-5 in accordance with variant B takes place during the entire operation of the metal forming plant 1 comprising the heat exchanger 12.

LIST OF REFERENCE SIGNS

1 Metal forming plant
2 Pump of the hydraulic system
3 Drive motor of the pump 2
4 Working fluid supply source
5 Working fluid
6 Rolling stand(s)
7 Outdoor temperature sensor
8 Server
9 Condition-monitoring device
10 Heat exchanger condition detection device
11 Display device
12 Heat exchanger
13 Primary circuit section of the heat exchanger 10
13A, 13E Outlet port and inlet port, as the case may be, of the primary circuit section 13
14 Temperature sensor at the inlet of the primary circuit section 13
15 Temperature sensor at the outlet of the primary circuit section 13
16 Pressure sensor or volume flow sensor, as the case may be
17 Circulating loop of the primary circuit
18 Secondary circuit section of the heat exchanger
18A, 18E Outlet port and inlet port, as the case may be, of the secondary circuit section 18
Mi Information about current maintenance urgency
Pp Conveying power of the pump
Pw Cooling power of the heat exchanger
Te, Ta Temperature on the primary side of the heat exchanger on the inlet side or the outlet side, as the case may be
Tu Outdoor temperature

The invention claimed is:

1. A method for monitoring a condition of a hydraulic system of a metal forming plant (1),
wherein the hydraulic system is coupled to or provided with
a pump (2) drivable by a drive motor (3) for providing a working fluid in the hydraulic system and with
a heat exchanger (12), a primary side (13) of which is flowed through by the working fluid and a secondary side (18) of which is provided with a cooling fluid for absorbing a part of a heat energy of the working fluid,
wherein the method comprises the following steps initiated by or carried out by a condition-monitoring device (9) during operation of the hydraulic system:
a) determining (S1) a current cooling power (Pw) of the heat exchanger (12);
b) determining (S2) a current conveying power (Pp) of the pump (2); and
c) determining (S4) a current maintenance urgency and/or a current ageing condition of the hydraulic system (Mi) based on the determined current cooling power (Pw) of the heat exchanger and the determined current conveying power (Pp) of the pump.

2. The method according to claim 1,
wherein the condition-monitoring device (9) further determines (S3) a current ambient temperature (Tu) of heat radiating surfaces of the hydraulic system and determines the current maintenance urgency and/or the current ageing condition of the hydraulic system (Mi) based also on the determined ambient temperature (Tu).

3. The method according to claim 2,
wherein the condition-monitoring device (9) determines as the current ambient temperature (Tu) of the heat radiating surfaces of the hydraulic system an outdoor temperature at a location of the hydraulic system and/or of the metal forming plant.

4. The method according to claim 2,
wherein the condition-monitoring device (9) determines as the current ambient temperature (Tu) of the heat radiating surfaces of the hydraulic system an outdoor temperature at a location of the hydraulic system and/or of the metal forming plant by retrieving weather data related to the location from a weather service server (8).

5. The method according to claim 1,
wherein the condition-monitoring device (9) determines information about an efficiency of the hydraulic system based on the determined cooling power (Pw) of the heat exchanger and the determined conveying power (Pp) of the pump.

6. The method according to claim 2,
wherein the condition-monitoring device (9) determines information about an efficiency of the hydraulic system based on the determined cooling power (Pw) of the heat exchanger and the determined conveying power (Pp) of the pump and the determined ambient temperature (Tu) of the heat radiating surfaces of the hydraulic system.

7. The method according to claim 1,
wherein the condition-monitoring device (9) determines the current maintenance urgency and/or the current ageing condition of the hydraulic system (Mi) based on a determined chronological course of the cooling power of the heat exchanger and/or a determined chronological course of the conveying power of the pump.

8. The method according to claim 7,
wherein the condition-monitoring device (9) determines and stores, in a retrievable manner, information for an optimized dimensioning of a further heat exchanger of a further hydraulic system of the same type as the hydraulic system based on the determined chronological courses of the cooling power of the heat exchanger and of the conveying power of the pump.

9. The method according to claim 1,
wherein the hydraulic system is an open hydraulic circuit.

10. The method according to claim 1,
wherein the metal forming plant (1) is a rolling mill plant, a pressing plant or a continuous casting plant.

11. The method according to claim 1,
wherein the condition-monitoring device (9) determines (S1-4) the current cooling power (Pw) of the heat exchanger based on measured values (Te, Ta, ΔP, Q) and default values (ρ, cp) assigned only to the working fluid.

12. The method according to claim 1,
wherein the condition-monitoring device (9) determines (S1-4) the current cooling power (Pw) of the heat exchanger based on a measured (S1-3) temperature difference (ΔT) of the working fluid brought about by the heat exchanger (12).

13. The method according to claim 1,
wherein the condition-monitoring device (9) determines (S1-4) the current cooling power (Pw) of the heat exchanger based on a measured (S1-2) or predetermined volume flow (Q) of the working fluid.

14. The method according to claim 13,
wherein the condition-monitoring device (9) determines (S1-2) the volume flow (Q) of the working fluid by measuring a pressure difference (Δp) of the working fluid.

15. The method according to claim 11,
wherein the default values comprise a specific heat capacity of the working fluid (cp) and/or a specific gravity of the working fluid (ρ).

16. The method according to claim 11,
wherein the determined cooling power (Pw) is rejected as implausible by the condition-monitoring device (9) if the measured values of the working fluid lie outside a defined working range.

17. A condition-monitoring device (9) for a hydraulic system of a metal forming plant (1),
wherein the hydraulic system is coupled to or provided with
a drivable pump (2) for providing a working fluid in the hydraulic system and with
a heat exchanger (12), a primary side (13) of which can be flowed through by the working fluid and a secondary side (18) of which can be provided with a cooling fluid for absorbing part of a thermal energy of the working fluid,
wherein the condition-monitoring device (9) is configured for carrying out the method according to claim 1.

18. The condition-monitoring device (9) according to claim 17,
wherein the condition-monitoring device comprises or is coupled to a power monitor (10, 11),
wherein the power monitor is configured to display the current cooling power (Pw) of the heat exchanger determined by the condition-monitoring device on a display device (11).

* * * * *